(12) United States Patent  (10) Patent No.: US 7,201,351 B2
Stigler  (45) Date of Patent: Apr. 10, 2007

(54) HOLDER COMPRISING A MOVABLE ARCH

(75) Inventor: Mario Stigler, Schoeffengrund (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/496,842

(22) PCT Filed: Dec. 2, 2002

(86) PCT No.: PCT/EP02/13571

§ 371 (c)(1),
(2), (4) Date: May 27, 2004

(87) PCT Pub. No.: WO03/048626

PCT Pub. Date: Jun. 12, 2003

(65) Prior Publication Data

US 2005/0067538 A1    Mar. 31, 2005

(30) Foreign Application Priority Data

Dec. 4, 2001   (DE) ................................. 101 59 277

(51) Int. Cl.
*F16L 3/08*   (2006.01)
(52) U.S. Cl. ................... 248/74.1; 248/74.2; 248/74.3; 24/16 PB

(58) Field of Classification Search ............... 248/68.1, 248/65, 74.1, 74.2, 74.3, 74.4, 230.1, 230.8, 248/316.5, 62, 74; 24/16 PB, 530, 543, 616; 403/397

See application file for complete search history.

(56) References Cited

U.S. PATENT DOCUMENTS

| | | | | |
|---|---|---|---|---|
| 2,408,572 A | * | 10/1946 | Morehouse | 248/74.3 |
| 2,551,710 A | * | 5/1951 | Slaughter | 362/355 |
| 3,054,587 A | | 9/1962 | Hebenstreit et al. | 248/74 |
| 3,606,218 A | | 9/1971 | Enlund et al. | 248/74 |
| 3,913,187 A | * | 10/1975 | Okuda | 24/484 |
| 4,441,677 A | | 4/1984 | Byerly | 248/74.3 |
| 4,442,994 A | * | 4/1984 | Logsdon | 248/547 |
| 4,667,826 A | * | 5/1987 | Salacuse | 206/477 |
| 4,881,705 A | | 11/1989 | Kraus | 248/74.2 |
| 5,257,768 A | * | 11/1993 | Juenemann et al. | 248/604 |
| 6,126,119 A | * | 10/2000 | Giangrasso | 248/58 |
| 6,708,933 B2 | * | 3/2004 | Girodo | 248/74.2 |
| 2005/0067538 A1 | * | 3/2005 | Stigler | 248/65 |

* cited by examiner

*Primary Examiner*—Carl D. Friedman
*Assistant Examiner*—Tan Le
(74) *Attorney, Agent, or Firm*—Miles & Stockbridge P.C.

(57) ABSTRACT

A holder for elongated objects comprises a half-shell including an inner shell of elastic material, forming a spring structure, and an outer shell of a less elastic material. The inner shell comprises a bridge-like arch spanning an interior and freely movable outward of the half-shell.

11 Claims, 2 Drawing Sheets

HOLDER COMPRISING A MOVABLE ARCH

The invention relates to a half-shell of a holder for elongated objects, in particular pipes, lines or cable trees, having a spring structure attached to the half-shell on the inside to create a positive connection with the object.

In the prior art, holders consisting of two half-shells are known for securing electric lines, brake lines or other elongated objects. U.S. Pat. No. 4,881,705 describes a holder element of plastic having a lodgment portion for a pipe and a holding portion for attaching the holder element to a support, the lodgment portion comprising an insert of material softer than the plastic of the holding portion and the insert being connected to the holding portion by a two-component injection process. With such a holder, oscillations of an elongated object contained therein whose diameter substantially matches the diameter of the holding portion are damped, thus achieving noise abatement.

A disadvantage of available holding systems for elongated objects is that such holding systems are commonly provided for objects of substantially fixed pre-assigned diameter. The holding of objects of variable diameter, as for example with different numbers of cables, presents a problem for known holding systems. Also, objects of widely different diameter cannot be held with one and the same holder. Holding systems with soft inserts, for example, permit only minor variations of diameter.

In known holding systems, an object having a larger diameter than a clear space in the holder must be placed in the holder with excessive force. Such forces may damage either the object or the holder, and are undesirable during assembly.

An object of smaller diameter than the holder provides is not held securely enough, and there is danger that the object will loosen or oscillate.

Hence the present invention is to specify a half-shell for a holder capable of holding objects of different diameters, or of variable diameter, conservatively and safely, and of suitably proportioning the holding forces so as to secure an object.

This is accomplished by a half-shell for a holder having the features of claim 1. Advantageous embodiments, which may be employed each singly or combined in any way with each other, are the subject of the dependent claims.

The half-shell of a holder for elongated objects, in particular pipes or cablings, according to the invention, having a spring structure attached to the half-shell on the inside to provide a positive connection with the object, comprises a spring structure having a spring characteristic with a broken curve.

A spring characteristic curve specifies the force required to deform a spring by a certain distance, for example to compress or stretch it. The spring characteristic is the force-displacement curve, and characterizes the spring.

With the help of the holder, elongated objects may be attached to a carrier, for example, in automotive construction, to the bodywork of an automobile, or elongated objects may be bound together. The holder comprises one or more half-shells to accommodate the object. With the help of the spring structure on the half-shell, the object is fixed. This positive connection prevents unintentional release of the object from the half-shell.

Whereas in the prior art holders with spring structures are known whose spring characteristic, within the limits of tolerance, is a substantially linear curve (Hooke's law), the spring structure according to the invention, within its range of tolerance, has a broken curve. Owing to this broken curve, the half-shell is better able to accommodate objects of different diameters. Depending on the nature of the objects to be secured, the broken curve of the spring characteristic effects appropriate holding forces for the particular diameter of the object.

For example, for light lines, only comparatively small holding forces are required; for thick brake lines, however, more than proportionally large holding forces are needed. By the broken curve of the spring characteristic, the force required for a given diameter can be accurately adapted.

The problem of past holders, that outside of the range of tolerance of a spring structure, the spring force either collapses or, owing to an impact, increases excessively, so that objects of larger diameter are either not securely or too tightly held, is solved by the broken curve of he spring characteristic. Excessive holding forces for larger diameters, that may cause damage to the object or the holder, are avoided.

To ensure a secure hold on a thicker object, the slope of the spring characteristic at a kink advantageously increases by at least 20%, in particular by at least 50%, preferably by at least 100%. In order to preclude damage to the elongated object or to the half-shell, the slope of the spring characteristic at a kink increases by less than a factor of 50, in particular by less than a factor of 20, preferably by less than a factor of 10, and with especial preference, by less than a factor of 5.

With the half-shell according to the invention, it is brought about in this way that objects having a wider spectrum of diameters can be held or secured. Preferably, the ratio of the smallest diameter that the half-shell can accommodate to the largest diameter that the half-shell can accommodate is at least 1:1.2, in particular at least 1:1.5, preferably at least 1:2. In this last case, the greatest diameter that can be accommodated is double the smallest diameter that can be accommodated. Thus the same holder can be employed for objects of different thicknesses.

Another advantage of the half-shell according to the invention is that owing to the non-linearity, a better centering of the object at the center of the holder is achieved, since a deflection of the object from the center is opposed by a non-linear force, increasing more than proportionally with increasing deflection.

In an embodiment of the half-shell according to the invention, the half-shell comprises an inner shell forming the spring structure and an outer shell, the inner shell consisting of an elastic material and the outer shell of a less elastic material, and the inner shell comprising at least one first bridge-like arch spanning an inner space and freely movable outward.

The outer shell encloses the object at least in part, and lends special strength to the half-shell by reason of its rigidity. The inner shell forms the spring structure. The inner shell may have the conformation of an insert for the outer shell. It may be separate from the outer shell or connected to it by two-component injection molding technology ("2K-Technik"). The broken curve of the spring characteristic is achieved for example by the first bridge-like arch in connection with the inner shell in that the first bridge-like arch as such is elastically deformed retrocessively in a recess on the inner shell, and the inner shell as such is further elastically deformed.

If for example an object of smaller diameter is placed in the half-shell, only the first bridge-like arch is deformed. The object is therefore securely held by comparatively smaller holding forces. On the other hand, if an object of larger diameter is placed in the half-shell, the half-shell will be elastically deformed as well. Both the first arch and the half-shell each act as a spring. On the basis of the greater strength of the inner shell compared to the first bridge-like arch, the holding force increases more than proportionally. The cooperation of the inner shell with the first bridge-like arch achieves an (effective) resultant spring constant of the structure, which abruptly rises from a smaller value (given by the spring constant of the first bridge-like arch) upon transgression of a certain diameter, to a higher value (determined by the spring constant of the inner shell). The abrupt rise in effective spring constant of the spring structure is equivalent to a kink in the spring characteristic.

With the help of the kinked spring characteristic, greater holding forces can be achieved for an object of larger diameter than would be the case according to the linear function (Hooke's law).

Another decisive point here is that the tolerance range of the spring structure is enlarged. Whereas past spring structures allow only a narrow tolerance range, the interplay of the different springs of the associated kinked form of the spring characteristic create a broader tolerance range for different diameters. The tolerance range of a holding, in this context, means the range of possible diameters for which excessive holding forces, causing damage to an object, and too weak ones, failing to hold an object securely, are excluded.

In another embodiment of the half-shell according to the invention, the inner shell comprises at least one second bridge-like arch arranged alongside the first in lengthwise direction of the objects to be secured, the first arch leaving a smaller inner portion clear than does the second arch, and the second arch being in contact with the outer shell on the outside. The curvature of the first arch may lie in the same direction, for example inward, as the second arch, but it may also point in the opposed direction. What is important is that the first arch leaves a smaller inner region clear than does the second arch, so that an object having a smaller diameter is in contact only with the first arch, whereas objects of a larger diameter are in contact with both the first arch and the second arch.

By the combined force of both arches on the object, the spring constant is greater than with the action of a single arch. The properties of the spring structure are determined by the fact that from a certain diameter on, besides the action of a first spring, here provided by the first arch, a second spring goes into action, here prompted by the effect of the second arch.

In this way, various objects of different diameter and objects of varying diameter, such as for example cable trees, can be conservatively and safely secured and held with one and the same half-shell according to the invention.

Advantageously, the inner shell can serve as an insert into the outer shell. Thus the inner shell may in simple manner be made of a different material, in particular a softer material, than the outer shell. By the differential fabrication of the inner and outer shells, moreover, an improved uncoupling of vibrations between object and a carrier to which the half-shell is attached can be achieved.

It is of advantage if the inner shell interlocks with the outer shell. In this way a loosening of the inner shell from the outer shell, no matter whether an object is inserted in the half-shell or not, is ruled out.

In a special embodiment of the invention, the inner shell comprises an intermediate first arch and two external second arches. By such a symmetrical arrangement of the arch, a symmetrical distribution of holding forces acting on the object and hence a more secure hold on the object are ensured. It is advantageous also if the breadth of the second arch is smaller, i.e. the second arches are each narrower, than the intermediate first arch.

To uncouple the motion of the first arch from the second arch, the first arch is separated from the second arch by a slit. Then both end segments of each arch need not be connected to the inner shell. It is sufficient if the first or the second arch only is connected to the inner shell at an end segment. To achieve a higher rigidity, however, it is advantageous if the first arch and the second arch each comprise two end segments connected to each other, so that the first arch and the second arch cohere.

To give the first arch freedom of motion outward, the outer shell comprises a window. This ensures that the first arch, in the case of objects of larger diameter, does not press against the outer shell, which might unnecessarily limit the range of tolerance of the spring element. Any loading of the object or of the half-shell with excessive forces upon contact of the first arch with the outer shell is avoided.

In an advantageous embodiment of the half-shell according to the invention, the half-shell comprises teeth directed inward. The teeth each have the function of individual springs. The teeth may be attached either directly to the half-shell or to the inner shell as well as to the first or the second arch. With them, the characteristic curve of the spring element can be controlled. Inward, in this context, means that the teeth point towards the object to be secured.

In a preferred embodiment of the half-shell according to the invention, the spring structure is formed by a first spring element and a second spring element, the two spring elements extending different distances inward towards the inner shell.

By the differential length of the two spring elements, a kink is made in the characteristic curve of the spring. If the diameter of an object is small, only the spring constant of the first spring element acts; if it is so great that not only one of the two spring elements, but both the first spring element and also the second spring element, are tensed, the spring constant of the second spring element will act over and above.

By preassigned various spring elements of different lengths, several kinks may be made in the characteristic spring curve. The spring characteristic can be accurately adapted. If for example a thin object is held by first spring elements only, the resulting holding force is small. If a thicker object is held by first and by second spring elements, the resultant holding force is more than proportionally greater. The effective resulting spring constant of the spring structure is determined by the sum of the respective spring constants of the individual spring elements.

Advantageously, the inner shell consists of a rubber-like material.

To achieve an especially safe retention of the object, the half-shell can be assembled with a second half-shell, in particular one of similar structure, to form a complete pod. The pod prevents the object from escaping from the half-shell. Here it is not required that the half-shell must be secured in another carrier.

Additional advantageous embodiments and refinements of the invention will be illustrated with reference to the following drawing. Here the drawing is intended to illustrate important elements of the invention by example, without limiting the invention to these examples.

Schematically,

Figure 1:
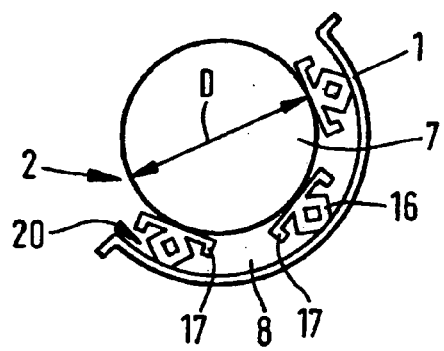
FIG. 1 shows a half-shell according to the invention, with an object, in cross-section.

FIG. 1 shows a half-shell 1 according to the invention with spring structure 2, positively holding an object 7 in an interior 8 of the half-shell 1. The spring elements 2 comprise a spring segment 16 and an elastic support segment 17. In the case of the object 7 shown, the diameter is so small that the object 7 is held by the force of the spring segments 16 alone. If an object 7 of greater diameter is taken, the spring segments 16 will be correspondingly more deformed, so that the support segments 17 will bear on the inner surface 20 of the half-shell 1 and in turn be elastically deformed. The spring constant of the spring structure 2 will thus be determined by the sum of the spring constant of the spring segments 16 and the spring constant of the elastic support segment 17. Thus a more than proportional holding force will result as soon as the diameter D of the object 7 exceeds a certain value. The resistance 7 is brought into the half-shell 1 by bending the object 7 according to its diameter D.

Figure 2:
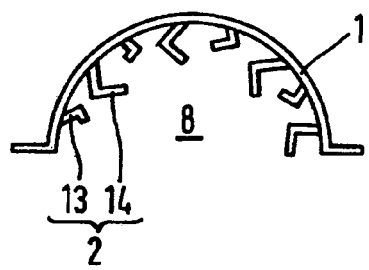
FIGS. 2 to 4 show alternative half-shells according to the invention, in cross-section.
Figure 3:
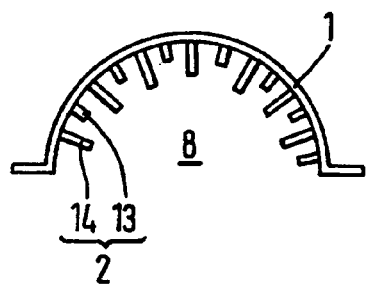
Figure 4:
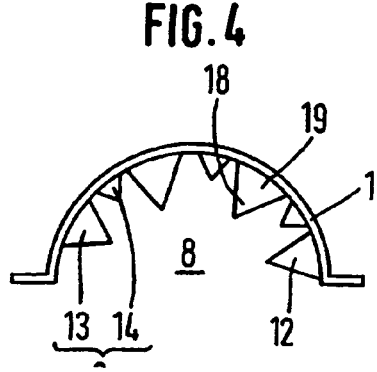

FIGS. 2 to 4 show different conformations of a half-shell 1 according to the invention having an interior 8, the spring structure 2 being formed by the cooperation of a first spring element 13 and a second spring element 14. The first spring element 13 extends less far into the interior 8 than the second spring element 14. In the case of objects (not shown) having a small diameter, only the second spring elements 14 are elastically deformed. The holding force is therefore determined only by the spring constant of the second spring element 14. In the case of objects of larger diameter, the second spring elements 13 will be deformed as well, so that the holding forces acting on the object will be co-determined by the spring constant of the first spring element 13 as well. By the differential length of the spring elements, a kinked form of the spring characteristic of the spring structure 2 is brought about. The half-shell 1 is intended to be assembled with another half-shell (not shown), in order together to form a shell enclosing an object.

FIG. 4 presents the peculiarity that the spring elements 13, 14 each individually do not exhibit a spring characteristic following a linear force function. The two spring elements 13, 14 are for example of conical configuration. The first spring element 13, or the second spring element 14, comprises a first end 18 and a second end 19, the thickness of the first and second spring element 13, 14 being different at the first end 18 from the thickness of the first or second spring element 13, 14 at the second end 19. This supports a more than proportional force increase of the spring structure 2 with increasing diameter D of an object 7.

Figure 5:
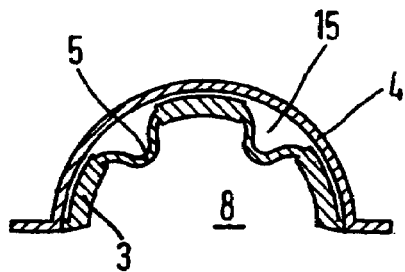
FIG. 5 shows a half-shell according to the invention with an inner shell in cross-section.

FIG. 5 shows a half-shell 1 according to the invention, having an inner shell 3 comprising a first arch 5, whose curvature extends into the interior 8. The first arch 5 spans an interior 15 arranged between an outer shell 4 and the inner shell 3. Objects having a smaller diameter are held only by the first arch 5, elastically deforming the first arch 5. Objects of greater diameter will additionally effect an elastic deformation of the inner shell 3. What this accomplishes is that both objects having a greater diameter and also objects having a smaller diameter can be securely held by the same half-shell 1.

Figure 6:
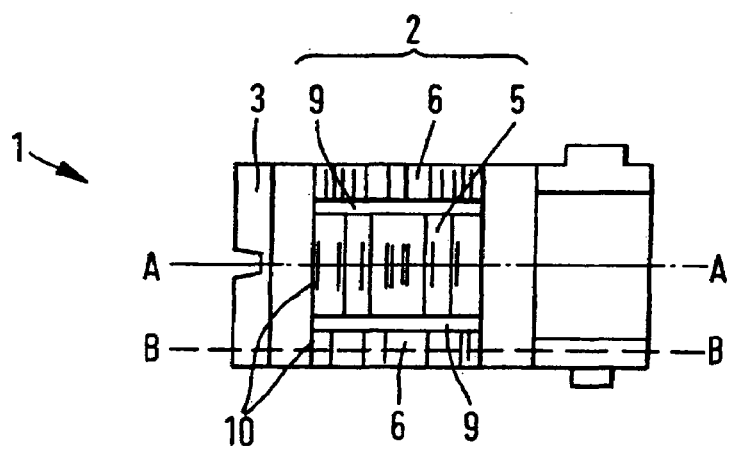
FIG. 6 shows a half-shell according to the invention with two arches, in a view from below.
Figure 7:
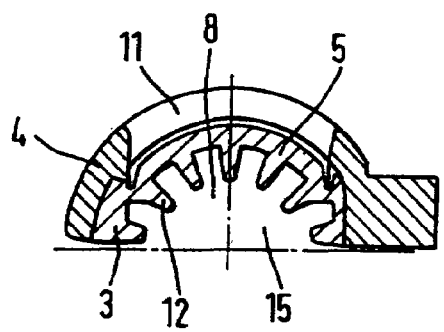
FIG. 7 shows the half-shell according to the invention of FIG. 6 at section A—A; and, FIG. 8 shows the half-shell according to the invention of FIG. 6 at section B—B.
Figure 8:
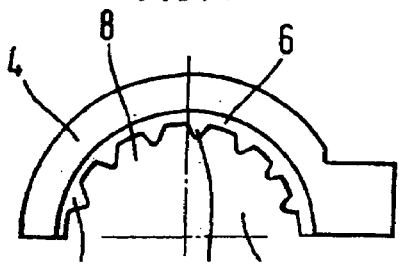

FIG. 6 shows a half-shell 1 according to the invention, having a first arch 5 and a second arch 6, in a view from underneath. FIG. 7 shows the half-shell 1 according to the invention of FIG. 6 in section A—A, and FIG. 8 shows the same half-shell in section B—B. As will be understood on viewing all three figures together, the first arch 5 leaves a smaller interior 8 free than does the second arch 6. The second arch 6 rests in contact with the outer shell 4. Objects having a smaller diameter will be securely held by teeth 12 provided on the inner shell 3. In the case of objects having a greater diameter, the first arch 5 is elastically deformed, escaping into a window 11 in the outer shell 4. By the escape of the first arch 5, a greater interior 15 is created to accommodate an object of greater diameter. In the case of greater diameters, the object contacts the teeth 12 of the second arch 6. In this case, the object is held both by the first arch 5 and also by the second arch 6, avoiding undesirable release of the object from the half-shell 1.

The invention relates to a half-shell of a holder for elongated objects 7, in particular pipes or cable trees, having a spring structure 2 fixed to the half-shell 1 on the inside to make a positive connection with the object 7, and is distinguished in that the half-shell 1 comprises a spring structure 2 having a spring characteristic with a broken curve. The invention relates in particular to a half-shell 1 having an outer shell 4 and having a spring structure 2 attached to the half-shell 1 on the inside to produce a positive connection with the object 7, formed by an inner shell 3, the inner shell 3 comprising at least one first bridge-like arch 5 spanning an interior 15 and freely movable outward, and at least one second bridge-like arch 6 arranged alongside the first arch 5 in lengthwise direction of the object 7 to be secured, where the first arch 5 clears a smaller interior 8 than the second arch 6 and the second arch 6 is in contact with the outer shell 4 on the outside. The half-shell 1 according to the invention is capable of conservatively and safely holding different objects 7 of widely different diameters.

LIST OF REFERENCE NUMERALS 1 half-shell
2 spring structure
3 inner shell
4 outer shell
5 first arch
6 second arch
7 object
8 interior
9 slit
10 end segments
11 window
12 teeth
13 first spring element
14 second spring element
15 interior
16 spring segment
17 stamping segment
18 first end
19 second end
20 inner surface
D diameter

The invention claimed is:

1. Half-shell (1) of a holder for elongated objects (7) having a spring structure (2) attached to the half-shell (1) on an inside thereof to produce a positive connection with the object (7), characterized in that the spring structure (2) has a spring characteristic with a broken curve, further characterized by the half-shell including an inner shell (3) forming the spring structure (2) and an outer shell (4), the inner shell (3) consisting of an elastic material and the outer shell (4) of a less elastic material, and the inner shell (3) comprising at least a first bridge-like arch (5) spanning an interior (15) and freely movable outward of the half-shell, and further characterized in that the inner shell (3) comprises at least one second bridge-like arch (6) arranged alongside the first arch (5) in lengthwise direction of the object (7) to be secured, the first arch (5) clearing a smaller interior (8) than the second arch (6) and the second arch (6) lying in contact with the outer shell (4) on an outside.

2. Half-shell (1) according to claim 1, characterized in that the inner shell (3) is insertable as an insert into the outer shell (4) interlockable with the latter.

3. Half-shell (1) according to claim 1, characterized in that the inner shell (3) comprises an intermediate first arch (5) and two exterior second arches (6).

4. Half-shell (1) according to claim 3, characterized in that the second arches (6) are narrower than the intermediate first arch (5).

5. Half-shell (1) according to claim 1, characterized in that the first arch (5) is separated from the second arch (6) by a slit (9) from each other.

6. Half-shell (1) according to claim 1, characterized in that the first and the second arches (6) each comprise two end segments (10) at which the first and second arches (5, 6) cohere together.

7. Half-shell (1) of a holder for elongated objects (7) having a spring structure (2) attached to the half-shell (1) on an inside thereof to produce a positive connection with the object (7), characterized in that the spring structure (2) has a spring characteristic with a broken curve, and further characterized by the half-shell including an inner shell (3) forming the spring structure (2) and an outer shell (4), the inner shell (3) consisting of an elastic material and the outer shell (4) of a less elastic material, and the inner shell (3) comprising at least a first bridge-like arch (5) spanning an interior (15) and freely movable outward of the half-shell, characterized in that the outer shell (4) comprises a window (11) to give the first arch (5) freedom in its outward motion.

8. Half-shell (1) according to claim 1, characterized by teeth (12) directed inward.

9. Half-shell (1) according to claim 1, characterized in that the inner shell (3) consists of a rubber-like material.

10. Half-shell (1) according to claim 1, characterized in that the half-shell (1) is assembled with a second half-shell to form a complete pod.

11. Half-shell (1) according to claim 1, characterized in that at least two elongated objects (7) are securable.

* * * * *